United States Patent [19]

Adams

[11] Patent Number: 4,465,400
[45] Date of Patent: Aug. 14, 1984

[54] METHOD AND MEANS FOR LAYING AN UNDERWATER PIPELINE

[75] Inventor: Robert A. Adams, Sumner, Wash.

[73] Assignee: Guy F. Atkinson Company, San Francisco, Calif.

[21] Appl. No.: 335,811

[22] Filed: Dec. 30, 1981

[51] Int. Cl.$^3$ .............................................. F16L 1/04
[52] U.S. Cl. .................................... 405/170; 405/169; 405/158
[58] Field of Search ............................... 405/168–173, 405/158, 159, 136, 137, 188, 190, 191; 166/338–344; 175/5, 7

[56] References Cited

U.S. PATENT DOCUMENTS

| | | | |
|---|---|---|---|
| 1,874,081 | 8/1932 | Burrows | 405/170 |
| 3,204,417 | 9/1965 | Robley | 405/170 |
| 3,267,682 | 8/1966 | Robley | 405/170 |
| 3,592,014 | 7/1971 | Brown | 405/169 |
| 3,658,366 | 4/1972 | Welch et al. | 405/169 X |
| 4,068,492 | 1/1978 | Reneau | 405/170 |
| 4,075,862 | 2/1978 | Ames | 166/343 X |
| 4,191,256 | 3/1980 | Croy et al. | 166/343 |
| 4,218,158 | 8/1980 | Tesson | 405/170 |

Primary Examiner—Dennis L. Taylor
Attorney, Agent, or Firm—Flehr, Hohbach, Test, Albritton & Herbert

[57] ABSTRACT

Sections of pipe for an underwater pipeline are laid by first positioning a support frame on the underwater terrain generally about the position for a section of pipe and then lowering a longitudinal pipe support and a section of pipe into engagement with the support frame. The position of the longitudinal pipe support on the support frame can be adjusted for proper positioning of the section of pipe with previously laid pipe. After a section of pipe is laid and supported by backfill, the underwater support frame is moved to the position for the next section of pipe. The support frame includes first and second transverse members each having a saddle for receiving a seat portion of the longitudinal pipe support. The saddles are moveable along the transverse members for adjusting the position of a section of pipe, and one of the transverse members is moveable. The longitudinal pipe support is moveable on a roller in the saddle on the fixed transverse member. The support frame includes a plurality of extendable vertical legs for engaging the underwater terrain.

12 Claims, 8 Drawing Figures

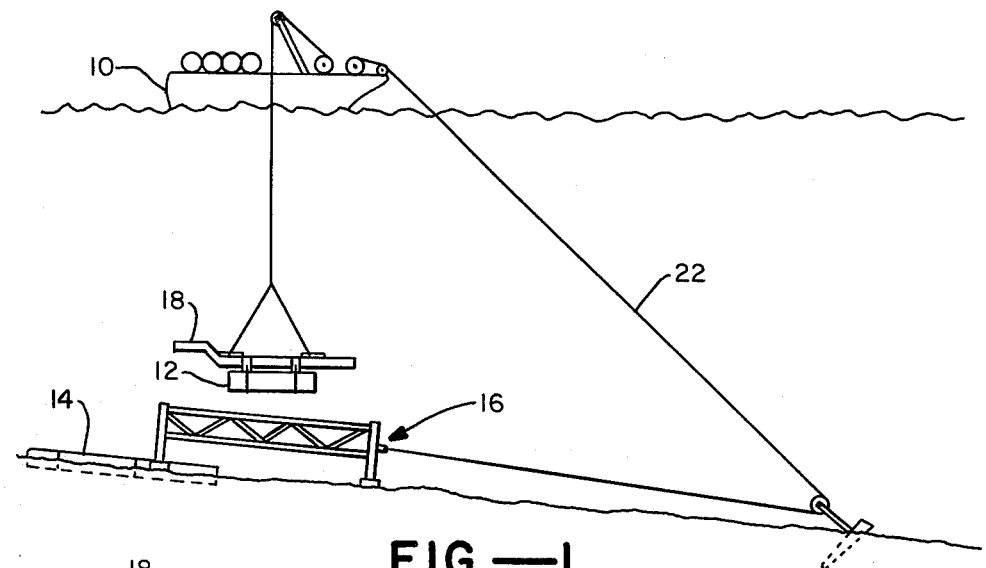
FIG.—1
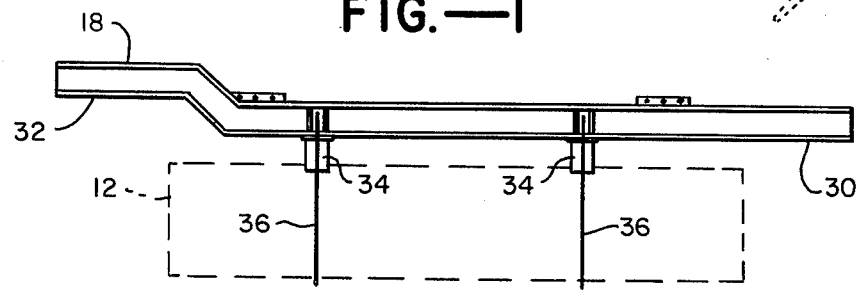
FIG.—2
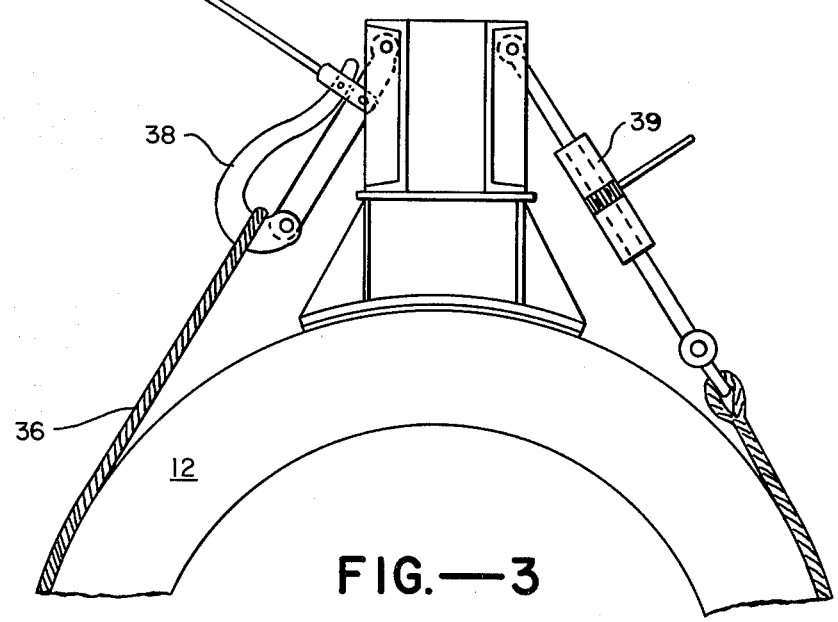
FIG.—3

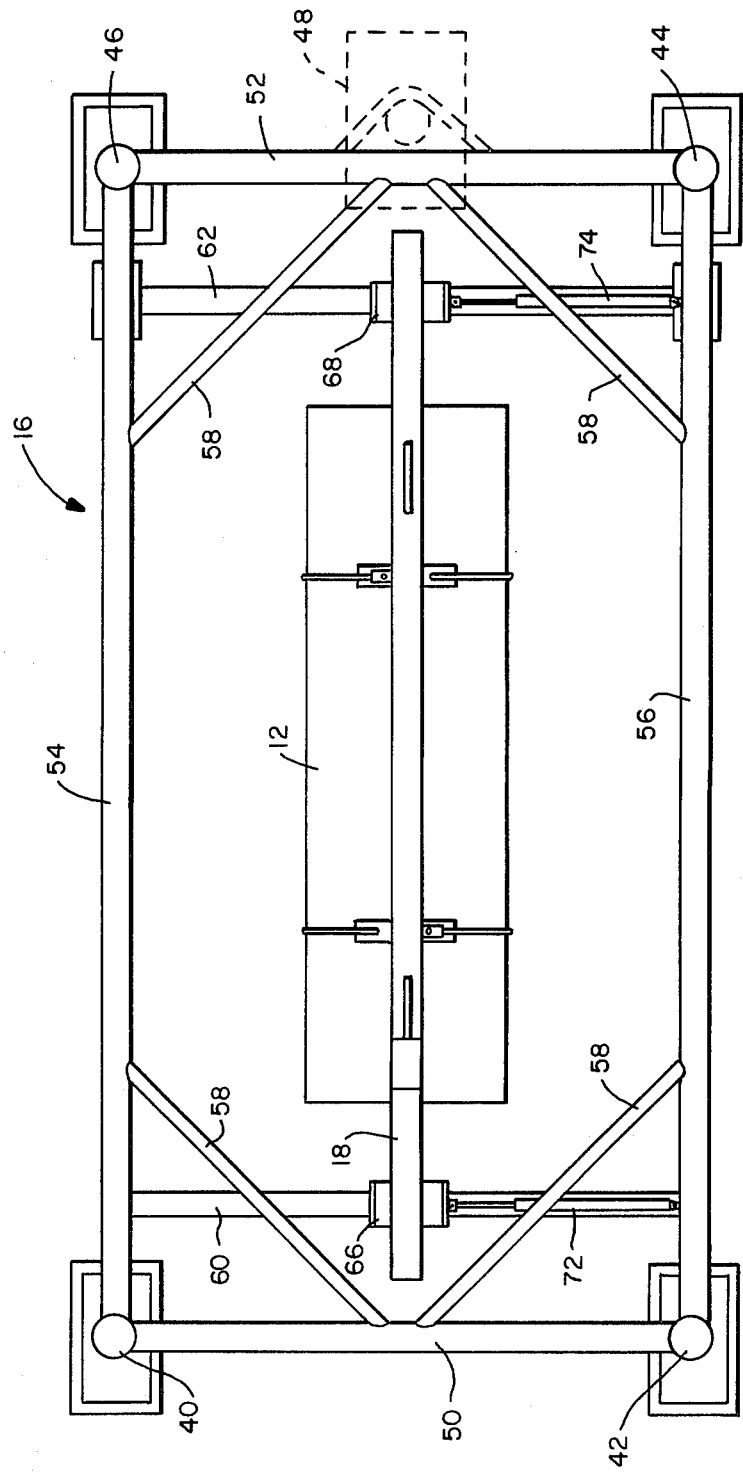
FIG.—4

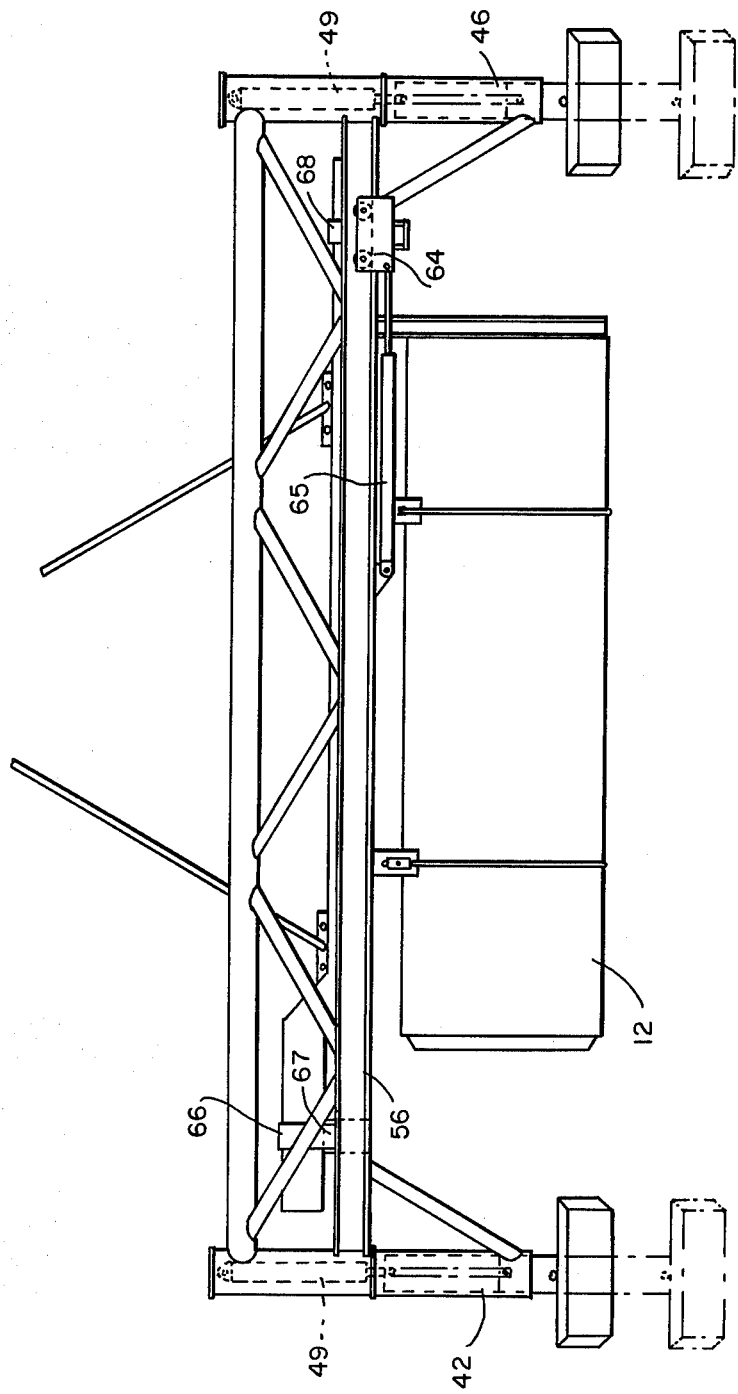
FIG.—5

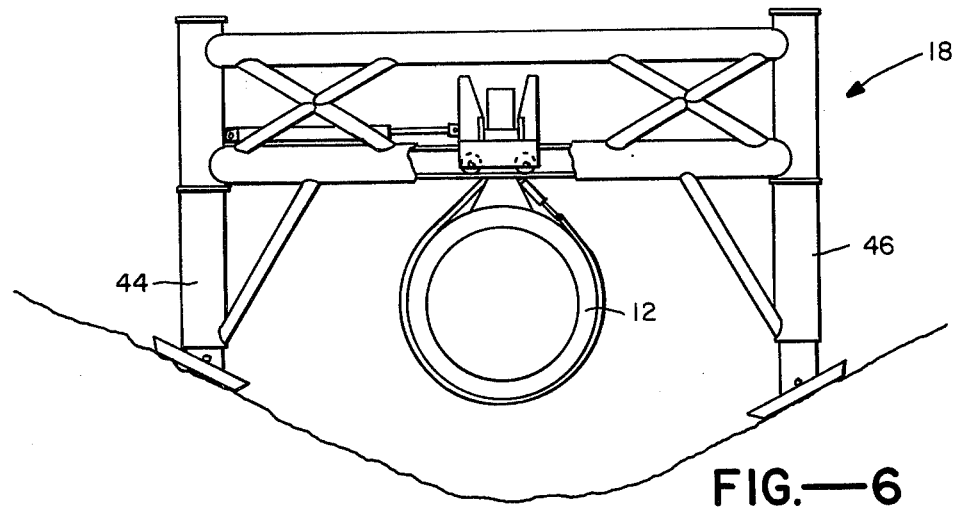
FIG.—6
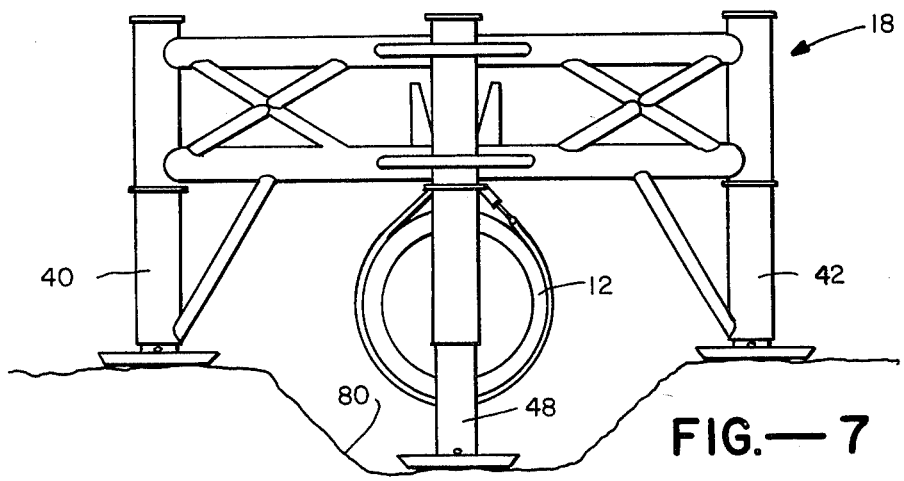
FIG.—7
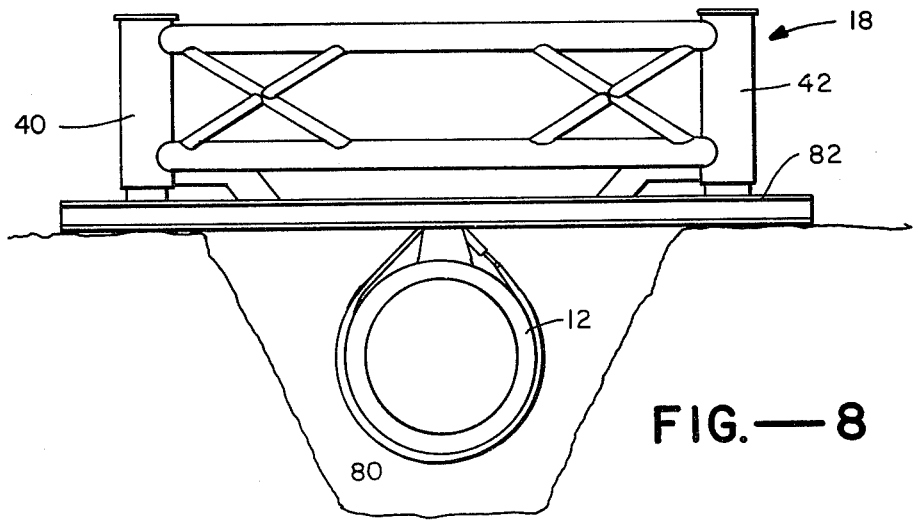
FIG.—8

METHOD AND MEANS FOR LAYING AN UNDERWATER PIPELINE

This invention relates generally to construction of underwater pipelines, and more particularly the invention relates to apparatus and method of laying sections of pipe underwater.

The laying of underwater pipelines requires handling and accurate positioning of pipe sections which are bulky and heavy. For example, pipe sections 24 feet in length, 7 feet in diameter, and weighing up to 30 tons each may be used in a sewer outfall into the ocean. Further, the pipe may be placed at depths of 200 feet or more on uneven sea beds.

A number of techniques have been devised in laying such pipe. U.S. Pat. No. 1,874,081 discloses apparatus for positioning a plurality of preassembled sections of pipes on props or footings on the seabed. U.S. Pat. No. 3,656,309 discloses a cable support means including an inflatable bag for temporarily supporting a pipe section while back fill is pushed beneath and around the pipe section. This apparatus requires continuous support from the surface until the pipe section is in final position. U.S. Pat. Nos. 3,204,417 and 3,267,682 disclose support frames for pipe sections which are lowered from a surface platform and placed on the ocean floor close to previously laid pipe and in a general alignment therewith. Fluid actuated legs on the support frame adjust the frame and pipe on the uneven seabed. The pipe section is then completely supported by the frame during the joinder of the pipe section and during the back fill operation. Thereafter, the support frame is raised to the surface for loading of another section of pipe.

An object of the present invention is an improved apparatus for laying pipe sections underwater.

Another object of the invention is the method of laying underwater pipe lines which is less time consuming than previous methods.

Still another object of the invention is apparatus which is readily positioned for laying pipe sections underwater.

Yet another object of the invention is apparatus for laying pipe underwater which is less cumbersome in use.

A feature of the invention is a support frame means which remains submerged on the seabed and a pipe support means for lowering a section of pipe in position with and supported by the support frame means.

Another feature of the invention is means for moving the section of pipe within the support frame means.

Still another feature of the invention is means for moving the support frame means on the seabed after laying of a pipe section.

Briefly, in accordance with the invention a support frame means is positioned underwater generally above the location for a section of pipe. The support frame means includes a plurality of extendable vertical supports for engaging the underwater terrain and first and second transverse members each having a saddle. A pipe support means including a longitudinal portion for positioning above a pipe section includes a plurality of fastening means for fastening a section of pipe to the longitudinal section. The pipe support means further includes seat portions at each end of the longitudinal portion for reception by the saddles of the support frame means. The support frame means further includes means for moving the pipe support means and a pipe section for alignment with previously laid pipe.

The invention and objects and features thereof will be more readily apparent from the following detailed description and appended claims when taken with the drawing, in which:

FIG. 1 is a side elevational view illustrating the pipe laying operation in accordance with the present invention.

FIG. 2 is a side view of pipe support means illustrated in FIG. 1.

FIG. 3 is an end view of the pipe support means of FIG. 2.

FIG. 4 is a top view of apparatus in accordance with one embodiment of the invention.

FIG. 5 is a side view of the apparatus of FIG. 2.

FIG. 6 is an end view of the apparatus of FIG. 4.

FIG. 7 is an end view of an alternative embodiment of the apparatus of FIG. 4.

FIG. 8 is an end view of apparatus in accordance with another embodiment of the invention.

Like elements in the several figures have the same reference numerals.

Referring now to FIG. 1, the method of laying pipe underwater in accordance with the invention is illustrated in a side elevation view of a surface vessel 10 lowering a section of pipe 12 for placement with the pipeline 14 on the seabed. Positioned on the underwater terrain is a support frame shown generally at 16 which receives a pipe support means 18 to which the pipe section 12 is fastened. Upon receiving the pipe section 12 and support 18, the support frame 16 is operated by an underwater diver who accurately positions the pipe section 12 for alignment with and attachment to the last section of the pipeline 14. After the pipe section 12 is fastened to the pipeline 14 and backfill is provided beneath and around the pipe section 12, the pipe support 18 is again lifted to the surface vessel 10 for the loading of another pipe section on the deck of the vessel. While the next pipe section is being fastened to the support member 18, the support frame 16 is moved along the underwater terrain such as by a cable 22 driven by a reel 24 on the vessel 10 whereby the support frame 16 is positioned generally about the location for the next pipe section.

Since the support frame 16 remains on the seabed and can be readily incremented for receiving the next pipe section, less time is required in positioning the next section of pipe as compared to the prior art apparatus in which the entire structure is removed from the seabed for loading of a pipe segment. Moreover, the pipe support 18 is more readily handled on the deck of vessel 10 in attaching a section of pipe thereto.

FIG. 2 is a side view of the longitudinal pipe support 18, and FIG. 3 is an end view of the pipe support 18. The support 18 includes a first seat portion 30 at one end and a second, offset seat portion 32 at the other end. The central section of the support 18 includes fasteners 34 from which cables 36 depend for attaching a pipe to section 12. One end loop of the cable engages a hook 38 for manual release by an undersea diver, and the other end of the cable is attached to a hydraulically actuated release 39.

FIG. 4 and FIG. 5 are a top view and a side view, respectively, of the support structure 16 with the pipe support 18 positioned therein. In this embodiment the support structure 18 comprises four vertical, extendable legs 40, 42, 44, and 46. Alternatively, the two offshore legs 44 and 46 can be replaced by a single leg 48. The legs 40 and 42 are joined by a transverse support bracket 50, and the legs 44 and 46 are joined by a transverse support bracket 52. Legs 40 and 46 are joined by a longitudinal support bracket 54, and legs 42 and 44 are joined by a longitudinal support bracket 56. Brackets 58 are provided as corner supports between the transverse brackets and the longitudinal brackets. Each of the legs are vertically extendable by means of hydraulic cylinders 49, as shown in FIG. 5.

A fixed carriage beam 60 is provided across the on shore portion of the support structure, and a moveable carriage beam 62 is provided across the offshore portion of the support structure 16. As illustrated in FIG. 5, the offshore carriage beam 62 is moveably mounted by rollers 64 on the longitudinal I-beams 54 and 56 with hydraulic cylinders 65 driving the carriage beam 62. The fixed carriage beam 60 has a saddle portion 66 for receiving the seat 32 of the pipe support 18, and the moveable offshore carriage beam 62 has a saddle 68 for receiving the seat 30 of the pipe support 18. The saddle 66 includes a roller 67 on which the seat 32 is received. Thus, when the offshore carriage beam 62 is moved by means of hydraulic cylinders 65 mounted on either side of the support frame, the seat 32 can move on the roller 67 of the saddle 66.

Further, saddles 66 and 68 are moveably mounted on the I-beam carriage beams 60 and 62 by means of rollers similar to rollers 64. Cylinders 72 and 74 move the saddles 66, 68 and the pipe support 18 mounted therein for alignment of the pipe 12.

Thus, the pipe 12 in the support frame 16 can be moved vertically for alignment with the pipeline 14 by actuation of the extendable legs 40–46, and the pipe 12 can be aligned horizontally with the pipeline by movement of the saddles 66, 68. Thereafter, a spigot on the pipe 12 can be inserted into the bell portion at the end of the laid pipeline 14 by movement of the offshore carriage beam 62.

FIG. 6 is an end view of the support frame 16 with the legs 44 and 46 positioned on the sloping surface of the seabed. After the pipe is fastened in the laid pipeline, back fill is provided beneath and around the pipe for support prior to releasing the pipe from the support frame 18.

FIG. 7 is an end view of an alternative embodiment of the support frame in which the offshore legs 44 and 46 are replaced by the single leg 48 which rests on the bottom of the trench 80. Legs 40 and 42 are shortened to rest on the seabed above the trench 80.

FIG. 8 is an end view of yet another embodiment of the apparatus for placing the pipe 12 in a deeper trench 80. In this embodiment a beam 82 is used to span the trench 80, and the legs 40 and 42 of the support frame engage the beam 82.

Thus, it is seen that different embodiments of the apparatus can be used when placing the pipeline on the surface of the bed or in trenches of varying depth in the seabed.

Apparatus in accordance with the invention has proved to be easier to handle in lowering pipe sections to the seabed and in positioning the pipe sections on the seabed for attachment to a pipeline. The operation of the apparatus is less time consuming than known prior art apparatus which is completely removed from the sea bottom for loading of pipe sections or which must be supported from the surface until the pipe is joined in the pipeline.

While the invention has been described with reference to specific embodiments, the description is illustrative of the invention and is not to be construed as limiting the invention.

Various modifications and applications may occur to those skilled in the art without departing from the true spirit and scope of the invention as defined by the appended claims.

What is claimed is:

1. Apparatus for laying sections of pipe underwater comprising
    pipe support means including a longitudinal portion for positioning above a pipe section and fastening means for fastening a section of pipe to said longitudinal portion, and
    a support frame for positioning underwater generally about the location for a section of pipe, said support frame including means for supportably receiving said pipe support means and including first and second transverse members each having a saddle means for receiving opposing ends of said longitudinal portion.

2. Apparatus as defined by claim 1 wherein said support frame includes a plurality of extendable vertical legs for engaging the underwater terrain.

3. Apparatus as defined by claim 1 wherein said support frame further includes means for moving said pipe support means longitudinally in said support frame.

4. Apparatus as defined by claim 3 wherein at least one of said saddle means includes a roller on which said longitudinal portion is supported.

5. Apparatus as defined by claim 3 and further including means for moving said saddles on said transverse members.

6. Apparatus for laying pipe underwater comprising
    pipe support means including a longitudinal portion for positioning above a pipe section and a plurality of fastening means for fastening a section of pipe to said longitudinal portion, said pipe support means further including seat portions at each end of said longitudinal portion, and
    support frame means for positioning underwater generally about the location for a section of pipe, said support frame means including first and second transverse members each having a saddle means for receiving a seat portion of said pipe support means, a plurality of extendable vertical legs for engaging the underwater terrain, means for moving said extendable vertical legs vertically, means for axially moving said pipe support means on said support frame means, and means for moving said saddle means on said transverse members.

7. Apparatus as defined by claim 6 and further including means for moving said support frame after a section of pipe is laid.

8. A method of laying sections of pipe underwater comprising the steps of
    providing a support frame on underwater terrain and generally about a location for a section of pipe,
    fastening a section of pipe to a longitudinal pipe support, and
    lowering said longitudinal pipe support and section of pipe into fully supported engagement with said support frame.

9. The method as defined by claim 8 and further including the step of adjusting the position of said longitudinal pipe support and the section of pipe within said support frame.

10. The method as defined by claim 9 wherein said step of adjusting the position of said longitudinal support member includes moving said longitudinal pipe support in said support frame.

11. The method as defined by claim 10 and further including the step of backfilling around and beneath the section of pipe.

12. The method as defined by claim 11 and further including the step of moving said support frame on said underwater terrain prior to receiving another section of pipe.

* * * * *

UNITED STATES PATENT AND TRADEMARK OFFICE
CERTIFICATE OF CORRECTION

PATENT NO. : 4,465,400

DATED : August 14, 1984

INVENTOR(S) : Robert Alan Adams

It is certified that error appears in the above—identified patent and that said Letters Patent is hereby corrected as shown below:

Claim 11, line 1, change "10" to --9--.

Signed and Sealed this

Eighth Day of January 1985

[SEAL]

Attest:

Attesting Officer

GERALD J. MOSSINGHOFF

Commissioner of Patents and Trademarks